US009589399B2

(12) United States Patent
Taveau et al.

(10) Patent No.: US 9,589,399 B2
(45) Date of Patent: Mar. 7, 2017

(54) CREDENTIAL QUALITY ASSESSMENT ENGINE SYSTEMS AND METHODS

(71) Applicant: Synaptics Incorporated, San Jose, CA (US)

(72) Inventors: Sebastien Ludovic Jean Taveau, Redwood City, CA (US); Larry E. Hattery, Beaverton, OR (US); Frank Schwab, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 170 days.

(21) Appl. No.: 13/932,129

(22) Filed: Jul. 1, 2013

(65) Prior Publication Data

US 2014/0002238 A1 Jan. 2, 2014

Related U.S. Application Data

(60) Provisional application No. 61/667,149, filed on Jul. 2, 2012.

(51) Int. Cl.
*G06F 21/32* (2013.01)
*G07C 9/00* (2006.01)

(52) U.S. Cl.
CPC ................................ *G07C 9/00087* (2013.01)

(58) Field of Classification Search
CPC ................ H04L 9/32; G06K 9/62; G06F 9/00
See application file for complete search history.

(56) References Cited

U.S. PATENT DOCUMENTS

| | | | |
|---|---|---|---|
| 5,280,527 | A | 1/1994 | Gullman et al. |
| 5,326,104 | A | 7/1994 | Pease et al. |

(Continued)

FOREIGN PATENT DOCUMENTS

| | | | |
|---|---|---|---|
| EP | 2343677 | A1 | 7/2011 |
| EP | 2343679 | A1 | 7/2011 |
| EP | 2348472 | A1 | 7/2011 |
| EP | 2391053 | A1 | 11/2011 |
| JP | 2008/263658 | A | 10/1996 |
| JP | 2000/165378 | A | 6/2000 |
| JP | 2006/350767 | | 12/2006 |
| WO | WO 98/57247 | A1 | 12/1998 |
| WO | WO 03/007538 | A1 | 1/2003 |
| WO | WO 2005/018137 | A1 | 2/2005 |
| WO | WO 2010/034036 | A1 | 3/2010 |

OTHER PUBLICATIONS

Cerias, A, B-S et al. "Privacy Preserving Multi-Factor Authentication with Biometrics." In: Proceedings of the Second ACM Workshop on Digital Identity Management (DIM'06), Nov. 3, 2006; pp. 63-71. See pp. 65-68 (section 3-section 5).

(Continued)

*Primary Examiner* — Joseph Feild
*Assistant Examiner* — Pameshanand Mahase
(74) *Attorney, Agent, or Firm* — Leydig, Voit & Mayer, Ltd

(57) ABSTRACT

An authentication risk management system and method are disclose which may comprise a biometric identification unit configured to sense biometric data from a user and produce an image of the sensed biometric data with a stored template associated with the user; and a biometric identification unit natural identification evaluation engine configured to provide a natural identification authentication score. The system and method may further comprise a credentials quality assessment engine ("CQAE") configured to receive the natural identification authentication score and to provide a CQAE authentication score based one of the natural ID score and a combination of the natural ID score and a received computed authentication score. The CQAE may comprise at least a part of a user authentication profile engine.

19 Claims, 5 Drawing Sheets

(56) References Cited

U.S. PATENT DOCUMENTS

| | | | |
|---|---|---|---|
| 5,428,684 | A | 6/1995 | Akiyama et al. |
| 5,884,289 | A | 3/1999 | Anderson et al. |
| 6,173,400 | B1 | 1/2001 | Perlman et al. |
| 6,182,076 | B1 | 1/2001 | Yu et al. |
| 6,182,221 | B1 | 1/2001 | Hsu et al. |
| 6,332,193 | B1 | 12/2001 | Glass et al. |
| 6,460,163 | B1 | 10/2002 | Bowman et al. |
| 6,819,219 | B1 | 11/2004 | Bolle et al. |
| 6,963,974 | B1 | 11/2005 | Skinner et al. |
| 7,004,389 | B1 | 2/2006 | Robinson et al. |
| 7,014,107 | B2 | 3/2006 | Singer et al. |
| 7,174,323 | B1 | 2/2007 | Schultz et al. |
| 7,188,362 | B2 | 3/2007 | Brandys |
| 7,200,576 | B2 | 4/2007 | Steeves et al. |
| 7,269,256 | B2 | 9/2007 | Rosen |
| 7,283,534 | B1 | 10/2007 | Kelly et al. |
| 7,356,705 | B2 | 4/2008 | Ting |
| 7,398,390 | B2 | 7/2008 | Hyser |
| 7,505,941 | B2 | 3/2009 | Bishop et al. |
| 7,530,099 | B2 | 5/2009 | Flurry et al. |
| 7,543,737 | B2 | 6/2009 | Bensimon et al. |
| 7,565,330 | B2 | 7/2009 | Steeves et al. |
| 7,623,659 | B2 | 11/2009 | Huang et al. |
| 7,664,709 | B2 | 2/2010 | Chantani et al. |
| 7,685,629 | B1 | 3/2010 | White et al. |
| 7,752,450 | B1 | 7/2010 | Palmer et al. |
| 7,797,434 | B2 | 9/2010 | Blakley et al. |
| 7,831,840 | B1 | 11/2010 | Love et al. |
| 7,844,579 | B2 | 11/2010 | Peterson et al. |
| 8,032,932 | B2 | 10/2011 | Speyer et al. |
| 8,078,885 | B2 | 12/2011 | Jobmann |
| 8,112,787 | B2 | 2/2012 | Buer |
| 8,132,242 | B1 | 3/2012 | Wu |
| 2001/0029527 | A1 | 10/2001 | Goshen |
| 2002/0026478 | A1 | 2/2002 | Rodgers et al. |
| 2002/0073046 | A1 | 6/2002 | David |
| 2002/0112162 | A1 | 8/2002 | Cocotis et al. |
| 2002/0140542 | A1 | 10/2002 | Prokoski et al. |
| 2002/0156726 | A1 | 10/2002 | Kleckner et al. |
| 2002/0174348 | A1 | 11/2002 | Ting |
| 2003/0064805 | A1 | 4/2003 | Wells |
| 2003/0074559 | A1 | 4/2003 | Riggs |
| 2003/0135740 | A1 | 7/2003 | Talmor et al. |
| 2004/0010697 | A1 | 1/2004 | White |
| 2004/0034784 | A1 | 2/2004 | Fedronic et al. |
| 2004/0230536 | A1 | 11/2004 | Fung et al. |
| 2004/0260657 | A1 | 12/2004 | Cockerham |
| 2005/0097320 | A1 | 5/2005 | Golan et al. |
| 2005/0109835 | A1 | 5/2005 | Jacoby et al. |
| 2005/0177750 | A1 | 8/2005 | Gasparini et al. |
| 2005/0198377 | A1 | 9/2005 | Ferguson et al. |
| 2006/0005022 | A1 | 1/2006 | Wakamori et al. |
| 2006/0006224 | A1 | 1/2006 | Modi |
| 2006/0104486 | A1* | 5/2006 | Le Saint et al. .............. 382/115 |
| 2006/0159313 | A1 | 7/2006 | Hicks et al. |
| 2006/0212487 | A1 | 9/2006 | Kennis et al. |
| 2006/0222210 | A1 | 10/2006 | Sundaram |
| 2006/0259873 | A1 | 11/2006 | Mister |
| 2006/0287963 | A1 | 12/2006 | Steeves et al. |
| 2007/0016943 | A1 | 1/2007 | M'Ralhi |
| 2007/0021198 | A1 | 1/2007 | Muir et al. |
| 2007/0031009 | A1 | 2/2007 | Mwale |
| 2007/0038867 | A1 | 2/2007 | Verbauwhede et al. |
| 2007/0057763 | A1 | 3/2007 | Blattner et al. |
| 2007/0067828 | A1 | 3/2007 | Bychkov |
| 2007/0106895 | A1 | 5/2007 | Huang et al. |
| 2007/0174206 | A1 | 7/2007 | Colella |
| 2007/0180263 | A1 | 8/2007 | Delgrasso et al. |
| 2007/0198435 | A1 | 8/2007 | Siegal et al. |
| 2007/0226516 | A1 | 9/2007 | Kubota |
| 2007/0241861 | A1* | 10/2007 | Venkatanna et al. ........ 340/5.52 |
| 2007/0245152 | A1 | 10/2007 | Pizano et al. |
| 2007/0245154 | A1 | 10/2007 | Akkermans et al. |
| 2007/0266342 | A1 | 11/2007 | Chang et al. |
| 2008/0072061 | A1 | 3/2008 | Cannon et al. |
| 2008/0072063 | A1 | 3/2008 | Takahashi et al. |
| 2008/0077796 | A1 | 3/2008 | Lund et al. |
| 2008/0127311 | A1 | 5/2008 | Yasaki et al. |
| 2008/0155269 | A1 | 6/2008 | Yoshikawa |
| 2008/0170695 | A1 | 7/2008 | Adler et al. |
| 2008/0178008 | A1 | 7/2008 | Takahashi et al. |
| 2008/0183728 | A1 | 7/2008 | Cornelius et al. |
| 2008/0185429 | A1 | 8/2008 | Saville |
| 2008/0189411 | A1 | 8/2008 | Motoyama et al. |
| 2008/0222049 | A1 | 9/2008 | Loomis et al. |
| 2008/0244277 | A1 | 10/2008 | Orsini et al. |
| 2008/0289020 | A1 | 11/2008 | Cameron et al. |
| 2008/0320600 | A1 | 12/2008 | Pandiscia et al. |
| 2009/0013191 | A1 | 1/2009 | Popowski |
| 2009/0024499 | A1 | 1/2009 | Ribble |
| 2009/0070860 | A1 | 3/2009 | Hirata et al. |
| 2009/0089867 | A1 | 4/2009 | Weatherford et al. |
| 2009/0116703 | A1* | 5/2009 | Schultz ......................... 382/118 |
| 2009/0132813 | A1 | 5/2009 | Schibuk |
| 2009/0164796 | A1 | 6/2009 | Peirce |
| 2009/0164798 | A1 | 6/2009 | Gupta |
| 2009/0210942 | A1 | 8/2009 | Abel |
| 2009/0217366 | A1 | 8/2009 | Gao et al. |
| 2009/0219154 | A1* | 9/2009 | Kukula .............. G06K 9/00006 340/540 |
| 2009/0228714 | A1 | 9/2009 | Fiske et al. |
| 2009/0265555 | A1 | 10/2009 | Royer |
| 2009/0313687 | A1 | 12/2009 | Popp et al. |
| 2009/0319435 | A1 | 12/2009 | Little, Jr. et al. |
| 2010/0049659 | A1 | 2/2010 | Cassone |
| 2010/0088754 | A1 | 4/2010 | Ghislanzoni |
| 2010/0146275 | A1 | 6/2010 | Slick et al. |
| 2010/0186083 | A1* | 7/2010 | Shinzaki ................. G06F 21/32 726/19 |
| 2010/0191634 | A1 | 7/2010 | Macy et al. |
| 2011/0060913 | A1 | 3/2011 | Hird et al. |
| 2011/0082791 | A1 | 4/2011 | Baghdasaryan et al. |
| 2011/0082800 | A1 | 4/2011 | Baghdasaryan et al. |
| 2011/0082801 | A1 | 4/2011 | Baghdasaryan et al. |
| 2011/0082802 | A1 | 4/2011 | Baghdasaryan et al. |
| 2011/0083016 | A1 | 4/2011 | Kesanupalli et al. |
| 2011/0083018 | A1 | 4/2011 | Kesanupalli et al. |
| 2011/0083170 | A1 | 4/2011 | Kesanupalli et al. |
| 2011/0083173 | A1 | 4/2011 | Baghdasaryan et al. |
| 2011/0138450 | A1 | 6/2011 | Kesanupalli et al. |
| 2011/0182480 | A1* | 7/2011 | Murakami et al. ........... 382/115 |
| 2012/0012652 | A1 | 1/2012 | Couper et al. |
| 2012/0117633 | A1* | 5/2012 | Chakra et al. .................... 726/7 |
| 2013/0272586 | A1 | 10/2013 | Russo |

OTHER PUBLICATIONS

Hiltgen, et al., "Secure Internet Banking Authentication", IEEE Security and Privacy, IEEE Computer Society, New York, NY, US, Mar. 1, 2006 (Mar. 1, 2006), pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008 (May 31, 2008), pp. 1-149, XP002630374, Retreived from the Internet: URL:http://alexandria.tue.nl/extral/afstversl/wsk-i/hgt2008.pdf [retreived on Mar. 29, 2011] *pp. 127-134, paragraph 6.2*.

ITD, "Anti-Money Laundering", ITD, Jan. 22, 2009.

Edward Suh and Ariniva Devadas: Physical uncloneable functions for device authentication and secret key generation, ACM, Proceedings of the 44th annual Design Automation Conference, 2007, New York.

International Bureau of WIPO, International Preliminary Report on Patentability for PCT/US2013/049018 (Jan. 15, 2015).

* cited by examiner

| Biometric | Verify | ID | Accuracy | Reliability | Error Rate | Errors | False Pos. | False Neg. |
|---|---|---|---|---|---|---|---|---|
| Fingerprint | ✓ | ✓ | Very High | High | 1 in 500+ | Dryness, dirt, age | Ext. Diff. | Ext. Diff. |
| Facial Recognition | ✓ | ✗ | High | Medium | No data | Lighting, age, glasses, hair | Difficult | Easy |
| Hand Geometry | ✓ | ✗ | High | Medium | 1 in 500 | Hand injury, age | Very Diff. | Medium |
| Voice Recognition | ✓ | ✗ | Medium | Low | 1 in 50 | Noise, weather, cold | Medium | Easy |
| Iris Scan | ✓ | ✓ | Very High | High | 1 in 131,000 | Poor lighting | Very Diff. | Very Diff. |
| Retinal Scan | ✓ | ✓ | Very High | High | 1 in 10,000,000 | Glasses | Ext. Diff. | Ext. Diff. |
| Signature Recognition | ✓ | ✗ | Medium | Low | 1 in 50 | Changing signatures | Medium | Easy |
| Keystroke Recognition | ✓ | ✗ | Low | Low | No data | Hand injury, tiredness | Difficult | Easy |
| DNA | ✓ | ✓ | Very High | High | No data | None | Ext. Diff. | Ext. Diff. |

FIG. 2

| Biometric | Security Level | Long-term stability | User Accept-ance | Intrusive | Ease of Use | Low Cost | Hardware | Standards |
|---|---|---|---|---|---|---|---|---|
| Fingerprint | High | High | Med | Somewhat | High | ✓ | Special, low cost | ✓ |
| Facial Recognition | Med | Med | Med | Non | Med | ✓ | Common Low Cost | ? |
| Hand Geometry | Med | Med | Med | Non | High | ✗ | Special Mid-price | ? |
| Voice Recognition | Med | Med | High | Non | High | ✓ | Common Low Cost | ? |
| Iris Scan | High | High | Med | Non | Med | ✗ | Special Expensive | ? |
| Retinal Scan | High | High | Med | Very | Low | ✗ | Special Expensive | ? |
| Signature Recognition | Med | Med | Med | Non | High | ✓ | Special Mid-price | ? |
| Keystroke Recognition | Med | Low | High | Non | High | ✓ | Common Low cost | ? |
| DNA | High | High | Low | Extremely | Low | ✗ | Special Expensive | ✓ |

FIG. 3

CREDENTIAL QUALITY ASSESSMENT ENGINE SYSTEMS AND METHODS

CROSS-REFERENCE

This application claims the benefit of U.S. Provisional Application No. 61/667,149 filed Jul. 2, 2012, entitled Credential Quality Assessment Engine Systems and Methods by Taveau et al., which application is incorporated herein by reference.

BACKGROUND

Authentication is a mechanism for verifying the identity of an individual or entity, e.g., one seeking access to a physical location or a visitor to a Web site or particular Web application. A simple form of authentication can be by requiring the user to give a user name and password as a visitor. Multi-factor authentication is an approach to security authentication which requires that the user of a system provide more than one form of verification in order to prove their identity and allow access to the system or some portion thereof, e.g., to a web-site or specific web-page/application. Multi-factor authentication takes advantage of a combination of several factors of authentication. Three major factors include verification by requiring something a user knows (such as a user name or password, etc.), something the user has, e.g., a software and/or hardware authenticator (also "token") (such as a smart card, Internet access device having, e.g., a unique a uniform resource locator (URL) identifier, or other security token), and something the user is (such as personal identifiers, e.g., biometrics: fingerprints, voice recognition, retinal scans, facial recognition systems, etc.). Each authentication factor can cover a range of elements used to authenticate, i.e., verify a person's identity prior to being granted access, approving a transaction request, signing a document or other work product, granting authority to others, etc. Due to their increased complexity, authentication systems using a multi-factor configuration in general are harder to compromise than ones using a single factors, even ones using several different examples of a single factor, e.g., both a user name and a password, personal identification number ("PIN") or the like.

An authenticator ("security token"), which as noted may be, e.g., a hardware/software token, authentication token, universal serial bus (USB) token, cryptographic token, electronic key fob (or the key itself), other user device with a unique URL or the like) may be a physical device that, e.g., an authorized user of computer services can be given, e.g., by the provider of the service, to facilitate authentication. The term may also refer to software tokens, e.g., contained within a hardware authenticator ("token"). Security tokens can be used to prove one's identity electronically (as in the case of a customer/user trying to access a bank account of the customer/user). The token can be used in addition to or in place of a password to prove that the customer/user is who he/she claims to be. The token can act, e.g., like an electronic key to access something, e.g., a physical location or a virtual location, e.g., on-line. Some tokens may store cryptographic keys, such as a digital signature, biometric data, or other data, which itself may be encrypted. Some token designs feature, e.g., tamper resistant packaging, while others may include small keypads to allow entry of a personal identification number ("PIN") or a simple button to start a generating routine with some display capability to show a generated key number or something to be used along with a user's key number, i.e., password or PIN. Some token designs can include, e.g., a USB connector, radio frequency ID ("RFID") functions or Bluetooth wireless interface to enable transfer of a generated key number or other authenticator number, code or the like, e.g., to a client system.

"True" multi-factor authentication requires the use of elements from two or more categories. Supplying a user name ("something the user knows") and password (more of "something the user knows") is still single factor authentication, despite the use of multiple pieces of distinct information. An example of true multi-factor authentication is requiring that the user also utilize a hardware token or Virtual Token™, a smart card or USB dongle, ("something the user has"), or a thumbprint or iris scanner print ("something the user is"), as opposed, e.g., to the biometric identifying data itself, which may be considered something the user "has," e.g., contained in a user token that the user has.

At the same time as validating the identity of a user, many relying parties, e.g., online sites, can, e.g., also attempt to confirm the validity of the site to the user (called "mutual authentication"), e.g., attestation of the validity of the identity of the site to the user, i.e., authentication in the opposite direction, i.e. "mutual"). A relatively weak form of mutual authentication generally displays, e.g., an image and/or phrase previously selected by the user. More advanced forms of mutual authentication can, e.g., engage in a challenge/response with the user's device, e.g., by exchanging a challenge, with the user device, which can be, e.g., a one-time key, and which the user device can identify as uniquely being from the particular relying party and to which the user's device can respond with a response unique to the user's device. There are many other possible examples.

A credential is an attestation of qualification, competence, or authority issued to an individual, usually by a third party with a relevant or de facto authority or assumed competence to do so. Issuance or granting of a credential is an act of such attestation. Relevant examples of credentials can include certifications, security clearances, identification documents, badges, passwords, user names, keys, including electronic, e.g., encryption keys, etc. Credentials in information technology ("IT") systems are widely used to control access to information or other resources. As an example the combination of a user account number or name and a secret password is a widely-used example of IT credentials. An increasing number of information systems use other forms of documentation of credentials, such as biometrics identifying templates, or X.509 certificates, public key certificates, etc.

Authentication factors for granting credentials to an individual or entity of the same type are generally subject to the same types of attack by fraudsters or spoofers. As an example, the "something you have" factor may be represented by and analogized to a key to a lock. The key embodies the authenticator, a secret which is shared between the lock and the key, i.e., as an example, the relying party and the user, and enables access by the user/possessor of the key to the place where access is desired to be controlled by the relying party. Such a system may be attacked in several ways, such as, an attack on the authenticator or management system used by the authenticator to issue the secret in order to obtain knowledge of the secret, as an example the authenticator, e.g., the key or a copy of the key.

As an example, in a computer system, obtaining such access might be possible through a structured query language ("SQL") injection. The attacker could steal the key from the authorized user and, if possible, make a copy of the key before the authorized user realizes the theft occurred, thus limiting the probability that the user will immediately change the key. In a so called "man-in-the-middle attack" the fraudster may insert himself/herself in the communication channel and masquerade as the authenticator, i.e., the party seeking authentication, i.e., the relying party, such as the employer of the valid user. In such a way, the intruder/fraudster can, e.g., intercept the user's provision of a key to the authenticator and then later use the key itself.

The security of the system therefore relies on the integrity of the authenticator and physical or electronic protection of the "something you have." Copy protection of the "something you have" can, therefore, be useful. This may comprise some form of physical tamper resistance or tamper-proofing. It may use a challenge/response to prove knowledge of the shared secret whilst avoiding risk of disclosure. It may involve the use of a pin or password associated with the device itself, independent of any password that might have been demanded as a first factor. A challenge/response, however, will not defeat a man-in-the-middle attack on the current authentication session but can prevent the attacker from successfully reusing or replaying credentials separately from the current session. Even biometrics are subject to spoofing by fraudsters. Fingerprints can be lifted from something touched by a user having the biometric as an authenticating factor. As seen in the movies and read in fiction eye balls can be gouged from the socket, hands can be lopped off, etc. In this context, systems that can detect whether or not the presented biometric is part of a living human can be useful in further maintaining the integrity of the presentation by the user of the "something you have."

There remains, therefore, a need for a system and method for authenticators, e.g., banks, credit card companies, telecommunications companies, computer operating systems, employers and the like to be able to assess the likelihood that a person or entity seeking a credential and therefore also credentialed access to a location, physical or in cyber-space, or authority to engage in a transaction, or both, is in reality the individual or entity that the authenticator ('relying party") believes the person or entity to be. Thus, there is a need for a strong authentication process. Such authentication can also be used in reverse for, e.g., users authenticating the authenticator. This is especially true for non-in-person access seeking and transaction authentications, "through the cloud," i.e., virtually over some electronic network, like the Internet.

SUMMARY

An authentication risk management system and method is disclosed, which may comprise: a credentials quality assessment engine ("CQAE") which may comprise a biometric identification unit configured to sense biometric data from a user and produce an image of the sensed biometric data and compare the image with a stored template associated with the user; a biometric identification unit natural identification evaluation engine configured to provide a natural identification authentication score; and a user authentication profile scoring engine configured to receive the natural identification authentication score and to provide a user authentication profile score based one of the natural identification authentication score and a combination of the natural identification authentication score and a received computed authentication score.

The authentication risk management system may further comprise: the computed authentication score being produced by a computed authentication scoring engine. The CQAE may comprise at least a part of a user authentication profile engine. The authentication risk management control system may further comprise a risk profile engine configured to provide a risk profile score based on one of the user authentication profile score and a combination of the user authentication profile score and a received device profile score. The authentication risk management control system may further comprise a risk profile engine configured to provide a risk profile score based on one of the natural ID score and a combination of one or more of the computed authentication score and a received device profile score.

The authentication risk management control system of may further comprise: the risk profile engine in communication with an on-network portion of the authentication management control system. The authentication risk management control system may further comprise: the on-network portion (100) of the authentication management control system comprising a risk management engine.

INCORPORATION BY REFERENCE

All publications, patents, and patent applications mentioned in this specification are herein incorporated by reference to the same extent as if each individual publication, patent, or patent application was specifically and individually indicated to be incorporated by reference, for all purposes and as if the reference were completely reproduced in the present application.

BRIEF DESCRIPTION OF THE DRAWINGS

The novel features of the disclosed subject matter are set forth with particularity in the appended claims. A better understanding of the features and advantages of the disclosed and claimed subject matter can be obtained by reference to the following detailed description that sets forth illustrative examples and embodiments, in which the principles of the disclosed and claimed subject matter are utilized, and the accompanying drawings of which:

FIG. 2 shows an illustration in chart form of examples of performance ratings for various forms of biometric identification types which may be useful with embodiments of the disclosed subject matter;

FIG. 3 shows an illustration in chart form of examples of utilization factors for various forms of biometric identification types which may be useful with embodiments of the disclosed subject matter;

DETAILED DESCRIPTION

Figure 1:
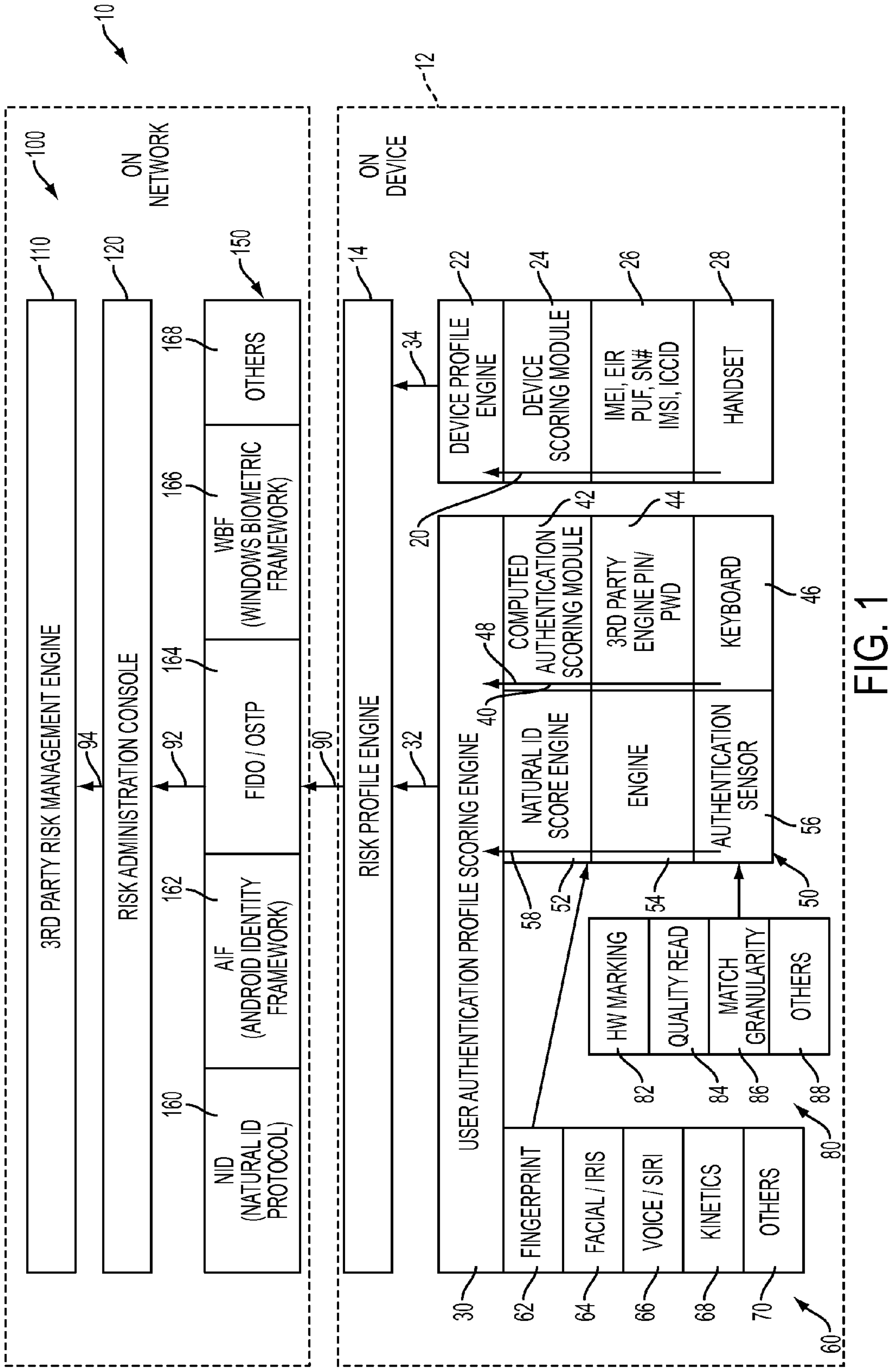
FIG. 1 shows in block diagram form an illustration of a credential quality assessment engine and the environment in which it could operate, according to aspects of embodiments of the disclosed subject matter.

The disclosed subject matter can be utilized to provide a method and apparatus for utilizing, as an example, an aggregate of multi-factor authentication factor inputs to create a user risk profile as well as a device risk profile, and in addition to provide an overall risk profile, as part of or in the form of, e.g., a credential quality assessment engine. The overall risk profile may be a rating to be used by a relying party, e.g., an authenticator bank, credit cart company, operating system provider, web site provider, content provider, one lone merchant, an employer and the like, e.g., using a third party risk management authentication assessor, to evaluate the authentication and assist in deciding whether or not to accept the authentication. In addition, the authentication process along with location information can be utilized for user location verification.

The disclosed subject matter can be utilized, e.g., in relation to an on-line login, e.g., to a secure web location and/or to a secure application hosted on or running on the secure web location, e.g., using a mechanism relating to sub-tokens, having, for example the quality of a master token. The disclosed subject matter can cooperate with and utilize "SecureKey" device authentication technology. SecureKey, Toronto, Ontario, Canada, provides a platform-as-a-service ("PAS") for authentication, payment and identification, which can employ a embedded security client in, e.g., laptops, tablets, mobile devices and the like. SecureKey employs chip-based identity and payment credentials, evaluating authentication based on the device PINs and passwords provided. Financial institutions, healthcare providers, telecoms, and government organizations have used SecureKey to provide two-factor and federated authentication and identity solutions.

Radio frequency identification ("RFID") is a generic term describing automatic identification ("auto-ID") systems and methods that can transmit identity information, e.g., in the form of a unique serial number, for an object, such as a mobile device, Blackberry®, PDA, etc. or personal information wirelessly, using radio waves. Auto-ID includes bar codes (linear or two dimensional matrix), optical character readers and the like, that relatively quickly and accurately input identification data. The user may be required, e.g., in using a bar code, linear or 2D, or color block code, to manually scan a label or tag to capture the data. RFID can be used to transmit the captured data to a computer system, without needing a person to be involved. The tag may have a microchip attached to a radio antenna mounted on a substrate, the microchip storing data, e.g., information about a product or shipment, date of manufacture, destination and sell-by date, or information about an individual or device.

An RFID reader can retrieve the stored data, e.g., by receiving signals from the tag, sometimes in response to a signal transmitted by the reader to the tag. The reader can then pass the information in digital form to a computer system. The RFID tags may utilize an electronic product code ("EPC"), e.g., enabling each tag to have a unique serial number for every item, individual, mobile device, etc. associated with the tag. Tags and readers can communicate through an air interface protocol, and a virtually unlimited amount of information from the tags and their use can be stored, e.g., in a secure Internet database, available to individuals and entities with appropriate access privileges.

According to aspects of embodiments of the disclosed subject matter, a credential quality assessment engine may be utilized as at least part of a system and method to provide additional and improved risk management tool(s) and capability(ies), e.g., to relying parties, e.g., service providers, operating system ("OS") vendors, telecommunications service providers, consumer credit card companies, mobile handset makers and the like. In order to manage risk, companies today (especially financial ones) acting as authentication seeking parties, i.e., relying parties, can use a two factors authentication, e.g., what the user who is seeking to be authenticated has (a payment card, an email address, a cellular phone, an RFID token, etc.) and what the user knows (a PIN, a password, etc.). However, e.g., with the increase of mobile based transactions, certain kinds of authentications, e.g., proving true ownership of a digital identity coming from a previously unknown device can be a challenge. According to aspects of the disclosed subject matter it is proposed to bring into the authentication equation additional elements from the three factor authentication model, e.g., a biometric element and/or a location element. An authentication validity engine can be utilized to form at least part of a natural identification score to complement, e.g., the SecureKey score. Also a device profile score may be utilized as part of the credential quality assessment engine portion of the user authentication profile engine.

According to aspects of embodiments of the disclosed subject matter the system and method may add the two further elements to risk management, i.e., who the user is (via a biometric) and where the user is. Combining all of these elements into the risk management policy can create benefits in reducing fraud, and also create opportunities to market premium authentication services to those in need of stronger authentication systems and methods. With the rise of the personal cloud, bring your own device ("BYOD"), and digital transactions from various digital IDs, this can be, e.g., a reliable way to prove the presence of the true owner of an ID as well as the existence of a trusted environment or source of input.

Applications logins may use a mechanism relating to sub-tokens relying on the quality (e.g., the existence and the life time and the type of input that is used) of a master token that can remove the requirement of multi-log-ins by linking the log-in to some other existing authentication like fingerprint recognition providing an output of an RSA key for public key/private key encrypted communications. As an example, there may be a ranking of the quality of a user password and/or pin, such as, one already approved by an authentication entity, such as PayPal. Data identifying a fingerprint or other biometric may be provided, e.g., to unlock a phone, by which a master token may be created temporarily and user accounts then populated by sub-tokens good for the life of the master token. A fast ID on-line ("FIDO") online secure transaction protocol ("OSTP") infrastructure may be utilized.

FIDO is a consortium being formed to standardize stronger authentication systems and methods. FIDO has been driven by the fact that there has been little or no standardization in the authentication industry. Proprietary solutions with varying user experiences have been applied, and there is still largely a reliance for authentication on passwords/PINs, and the like, something the user knows and/or the user device has. There remains no scalable strong authentication in the market today and no way for relying parties/entities to choose risk-appropriate authentication and/or to manage risk by, e.g., mixing and matching within a single infrastructure.

The user experience for those seeking authentication remains complicated. Reliance, e.g., on memorizing answers to security questions, such as a favorite ice cream, aunt or dog name, etc. can be cumbersome. Forgetting to bring along a dongle or other such token can be as well. Users may be forced to remember multiple passwords/pieces of information, e.g., for different sites and even per site. Therefore, FIDO has as its goal(s) to unify at least the back end authentication infrastructure, e.g., by enabling a relying party to choose the authentication type/system/process, and associated authentication score evaluation variations, as desired, and phase out dependency on passwords, PINs and the like. The system and method can, e.g., eliminate such requirements as the transmission of passwords on the wire, or through the cloud and avoid the storing of multiple passwords in such as a password vault or in the cloud. Also keeping the user experience simple, is an objective, e.g., by transforming the user device into a hardware token, providing for the same user experience across devices and destinations and providing faster access to the user, while maintaining the highest levels of authentication.

Turning now to FIG. 1 there can be seen in block diagram and chart form an example of a risk management authentication assessment system and method 10, which can have on the device elements 12 and on the network elements 100. As part of the on the device elements 12 there can be a risk profile engine 14 which provides an interface from the on the device elements 12 to the on the network elements 100. A credential quality assessment engine 40, 50 may be at least a part of a user authentication profile engine 30 and can serve to aggregate multiple authentication factor inputs to create a user authentication profile engine 30 output, i.e., score, to the risk profile engine 14 to be utilized in at least some embodiments along with or co-determined by a device profile engine 20 generating a device profile engine 20 output, i.e., score 34.

The natural ID engine 50 may produce a natural ID engine score 58 in a device profile engine 22 and a computed authentication engine 40 may produce a computed authentication engine score 48 in a computed authentication score engine 42. A natural authentication biometric image system 50, e.g., natural authentication image sensor 56, including an image sensor, 60, such as a fingerprint image sensor 62, and an image reconstruction system 54, such as is manufactured and sold by Validity Sensors, Inc., can be utilized to provide a core foundation for the user authentication profile scoring engine 30. The natural authentication image sensor 56 and its algorithms, such as matching algorithms, e.g., in a Validity Sensors, Inc. fingerprint imaging engine 54, may be used to match the sensed biometric, i.e., a fingerprint image, with a stored fingerprint image template. The effectiveness of such matching can be evaluated, e.g., for the combination of the hardware and software involved in the fingerprint sensor 56 and Validity Sensors matching engine 54 and can be leveraged to assign an authentication quality score/rating to form an output natural ID profile score 58.

This can provide at least a part of a strength or effectiveness rating 32 for sensing and matching the biometric, which, along with the combined device profile engine score 34, produced by a device profile engine 22, can result in producing some part of or all of a unique "quality" authentication assessment ranking/rating, i.e., a score 90 from the risk profile engine 14. The provider of any service having access to such a strong confirmation of both user and device in one request can apply this as part of the input(s) for a risk management engine 110. The natural ID score generator module 52 and/or some or all of the user authentication profile engine 14 may be embodied in a software engine executed from a chip connected to a sensor, e.g., the fingerprint sensor 56, and perform a leveraging algorithm.

The user authentication profile scoring engine 30 producing the user authentication profile engine score 32 can receive outputs from two modules, e.g., a natural ID authentication module 50 and a computed authentication module 40. The natural ID authentication module 50 can aggregate inputs from an authentication sensor element 56 (identifying who the user is), such as from sensors 60, e.g., a sensor of a fingerprint 62, facial recognition/iris recognition 64, voice recognition 66, such as SIRI, an intelligent personal assistant and knowledge navigator, and also kinetics 68 (the way a person moves) potentially detected by a camera on a laptop or an accelerometer or gyroscope in a device, and possibly others 70. The fingerprint sensor 56 may have some quality features 80, such as, hardware marking 82, meaning, e.g., the usage of PUF (Physical Unclonable Functions) or a Time Stamp generated by an RTC (Real Time Clock) and/or a unique manufacturing serial number of a component, e.g., to identify the particular make and model of the hardware; a quality of the reading of the fingerprint image 84, e.g., excellent, very good, good, poor; a matching granularity 86, meaning, e.g., the mapping of the image using 12 minutia points (US standard) or 16 points or 24 points for enhanced authentication (more accurate) or 8 points for faster access (less accurate); and possibly others 88.

The computed authentication score generating module 42 can aggregate inputs that are known by the users (what the user knows), but which can also be machine generated, such as, a PIN, a password, or what the user has, e.g., a 1D or 2D barcode, an encoded colorgram, etc., or some other token or key. Such a computed authentication engine 40 score 48 may be provided by a current service/software product 44, e.g., provided by SecureKey, which can work with PINS and passwords, e.g., entered through a keyboard 46, or produced from a secure memory (not shown).

Regarding the device profile engine 20, other elements may be integrated by a 3rd party, e.g., a mobile network operator ("MNO") or handset maker, an operating system ("OS") provider of such as Android or iOS or Windows, and can leverage elements unique to the device such as a usually unique international mobile equipment identity ("IMEI") number, or other codes 26, identifying, e.g., mobile phones, such as global system for mobile communications ("GSM") mobile personal communication devices, wideband code division multiple access ("WCDMA") and like wireless modulation schemes, and integrated digital enhanced network ("iDEN"), as well as other telecommunications equipment, e.g., some satellite phones.

Such number codes 26 can usually be found printed inside the battery compartment of the mobile phone or like personal mobile communication instrument. It can also be displayed on the screen of the phone, e.g., by entering *#06# into the keypad on most such phones. Also an equipment identity registration ("EIR"), a physically unclonable function generating ("PUF") circuit, e.g., embedded in silicon, a serial number, an international mobile subscriber identity ("IMSI") number, interstate communications commission ID ("ICCID"), subscriber identification module ("SIM") card unique identifying number, and, as well, geo-location elements such as global positioning system ("GPS") units on mobile devices, and general packet radio system ("GPRS") and GSM and other base-station based cellular systems using, e.g., mobile unit location triangulation, can all provide elements in the "who the user is" or "where the user is" authentication factor(s) category. These may be utilized in both the computed authentication score module 40 and the device profile engine score module 20, e.g., in a device scoring module 24 along with a device profile engine module 22, e.g., to produce a device profile engine score 34. That is the user may be identified both by one or more device identifications, unique to the device, and thus to the owner/operator of the device and also to the geographic location of such owner.

Such an on-device system and method 12 can include, by way of example, elements on the device, e.g., a laptop, mobile/cellular phone, etc. and above and beyond the physical biometric sensor, e.g., the authentication sensor 56. The authentication sensor 56, including, e.g., a fingerprint sensor 62, can provide input to an authentication input capture engine 54, which may also include matching software to match the input captured fingerprint image, e.g., to a stored image template associated with a user. A natural ID score module 50 may constitute a sub-scoring/quality assessment input 58 to the user authentication profile engine 30, forming, e.g., at least a part of a credential quality assessment engine 40, 50 as part of the user authentication profile engine 30.

A computed authentication score module 40 may provide a sub-scoring matching output 48 from the user credential quality assessment engine 40, 50. The user authentication profile engine 30 can form from the inputs 48, 58, e.g., from the computed authentication scoring engine 42 of the computed authentication scoring module 40, and the natural ID score engine 52, of the natural authentication scoring module 50, an output comprising a user credential quality assessment engine main quality read/score output 32 from the user authentication profile engine 30. This may be combined with the output 34, such as, from the device profile scoring engine 22, e.g., based on the output of the device scoring module 24 and scored and evaluated similarly to how a third party scoring engine, such as, from SecureKey, assesses validity and authentication accuracy where the inputs are, e.g., PINs and passwords of users, e.g., as relates to device scores produced in a device scoring module 24, e.g., using equipment identities 26, e.g., for a given specific user device, such as a handset 28. The inputs 32, 34 can be processed in the risk profile engine 14.

On the network, e.g., the Internet, i.e., in the modern vernacular, in the cloud, may reside a risk administration console 120, e.g., as a service provided by the provider of the natural ID scoring engine 52 and/or the device profile scoring engine 22. The risk administration console 120 may serve to adjust parameters of the output of the risk profile engine 14. The risk administration console 120 may constitute a plug-in module that may be, e.g., integrated into the third party risk management engine, 110, which may, in turn, be operated by a relying party, e.g., a bank, credit card company or other financial institution, a government entity, or other institution desirous of high quality authentication evaluation/scoring to determine whether to permit access, to permit a user to engage in a transaction, or to open an on-line wallet, or determine whether to approve a consumer credit card transaction, particularly in an on-line (i.e., a no physical presence or physical token present situation).

An integration connection layer 150 may utilize, as an example, a natural ID protocol 160 ("NID" protocol"), e.g., provided by the manufacturer and seller of the authentication sensor 56 and template matching apparatus and system 54. The integration connection layer 150 may include a device maker/OS provider identity framework, e.g., an Android identity framework 162. The integration connection layer 150 may utilize FIDO standards and protocols 164, e.g., "OSTP" network standards and protocols, as developed, or the like, or similarly directed standards and protocols, such as the Windows Biometrics Framework ("WBF") 166 or other such technologies 168 to facilitate communication through the risk administration console 120 to the back-end third party risk management engine 110. The results of user authentication engine scores and other assessments produced in the on device authentication elements 12 may form part of or form the basis for, or both, the input(s) to the third party risk management engine 110. In effect, as needed, the integration connection layer may, e.g., interpret or translate, etc. input data and information contained in the input 90 for use by either or both of the risk administration console 120 or third party risk management engine 110

The main component at the on the network level 100 may be the risk administrative console 120. The risk administration console 120 may allow the third party entity controlling the access, transaction, etc., through requiring the authentication, to apply risk policies to the model of the service provider, such as, the operator of the risk profile engine 14. As an example, there may be provided on the risk administration console 120 some indicators, e.g., an adjustment button, that can allow the risk assessor, e.g., the operator of the third party risk management engine 110, e.g., a relying party, to increase or decrease the level of the type, quality and the like, of the authentication assessment requirements, but also the number of parameters required to access an authentication service or an authentication application. In the risk administration console 120, the authentication service provider of the natural ID score 58, such as the provider of the biometric sensor/imager/matcher 54, 56 or the communication device, perhaps combined with the computed authentication score 48, on the one hand, and the device profile score 22 on the other hand, to see the source of generated scores, e.g., at least in part the highest ranking elements in quality that generated the overall score(s). Also visible/available may be the elements of an overall authentication score/rating, e.g., from the foundation of the score (founded in, e.g., the sensor 60 used for the particular biometric and the evaluating-matching-process) on up to the produced scores 32, 34. Scale may be decided by risk policy and/or the relying party user of the risk management engine 110, however, usually, e.g., for a natural ID, an accepted scale up exists, as are exemplified in the examples of FIGS. 2 and 3. The score can be clearly displayed (a %, a grade, a ranking, etc.), but also a quick visual clue (green=excellent input or sufficient parameters for the inputs for the service access request, yellow=average, red=not in line with existing risk policies, etc.)

According to aspects of embodiments of the disclosed subject matter some portions, or all of, e.g., the on-device system and method 12 may be comprised of a software engine, e.g., utilizing an algorithm or algorithms executed on, e.g., a computing device, e.g., embedded in an integrated circuit ("IC") connected to or contained as part of a sensor device, e.g., 60. Such a sensor device 60 may be, e.g., a fingerprint image sensor 56 and matching device 54, such as is manufactured and sold by Validity Sensors, Inc. of San Jose, Calif. The software authentication, e.g., matching engine 54, e.g., executing on the IC, may receive, e.g., input coming from particular sensors 60 in the place of the fingerprint authentication sensor 56, e.g., in the form of:

a microphone for voice capture;

a camera for facial or iris recognition; or an accelerometer and/or gyroscope for kinetics or detection of movements; and like sensors, e.g., as mentioned in FIGS. 2 and 3.

The authentication sensor 56 may in turn be part of a locking device, e.g., controlling access to a sensitive area, a laptop computing device controlling the ability to turn the device on and off, a mobile communication device, such as a smart phone, controlling access to making calls or access on-line to a web-site, web-page, user account, etc. Other information may also be received, e.g., beyond the binary match/no match determination, such as a sub-granularity under the match result. Sub-granularity may be used to indicate such things as, by way of example, an indication of which hardware type, manufacturer, version, etc. was used, the quality of the read (e.g., the identification of fingerprint minutia as excellent, good, average, poor), and quality of the stored template used for matching, the type and manufacture of the matching algorithm, a rating or other characterization of the match itself, e.g., the level of "sameness" between the capture image and the stored template, etc. This information may, e.g., form part of a foundation of an authentication assessment score or rating in a way similar to the rating of a device authentication using PINs and passwords and information about them, as is currently done by SecureKey, by a SecureKey engine 44 and/or in conjunction with a SecureKey engine 44 for either the Natural ID score 58 and/or the computed authentication score 48. Those skilled in the art will understand that like "foundations" may be utilized to evaluate other inputs from hardware and/or software elements of the overall system 10, for the intermediate and ultimate evaluations, e.g., in the risk administration console 120 for input to the third party risk management engine 110 or by the third party risk management engine 110 itself. In otherwords, from these foundations the quality, reliability, accuracy, etc. of the inputs are evaluated in addition to the inputs (match, no match, etc.) themselves.

as an example, such a system and method 10 may also be used in a similar way to rank the other forms of inputs received in the capture engine 56, e.g., by the HW sensor source components 60, as discussed above, and/or their hardware/software matching components 54. It will be understood that these and like pieces of information, as discussed in more detail below, may be utilized to provide a score, such as an authentication probability score, to the risk profile engine 14 and/or ultimately to the third party risk management engine 110, or a series of such scores, or simply be passed on to the risk profile engine 14 for evaluation as part of generating an authentication probability score 90 or the like, and/or passed on to the third party risk assessment engine 110 itself, for use in evaluation of other authentication information provided. In such a way, as an example, the third party risk assessment engine 110 may adjust upwardly or downwardly a risk assessment provided to the third party risk assessment engine 110, or may allow or at least facilitate the third party risk management engine in doing so itself, e.g., in deciding whether to accept the authentication information as sufficient or not, for the type and criticality of the security desired.

In this regard, turning to FIGS. 2 and 3, there is shown, respectively, an illustration in chart form of examples of performance ratings for various forms of biometric identification, which may be useful with embodiments of the disclosed subject matter, e.g., in arriving at associated scoring foundations and an illustration in chart form of examples of utilization factors for various forms of biometric identification types, which may be similarly useful with embodiments of the disclosed subject matter. FIG. 2 shows a chart of performance ratings, including for the categories of "verify," meaning a verification that the image of, e.g., the fingerprint provided by the sensor, matches the template of the image, e.g., stored in the device; "ID," meaning the ability to make an identification, i.e., the ability beyond the verification (match/no match) to identify the owner of this image/template (there is a match and it is Mr. ABC), "accuracy," "reliability," "error rate," "errors," etc., meaning causations of errors and sensitivity to factors causing errors, "false positives," and "false negatives." The categories are listed for such biometric devices and inputs as "fingerprint devices," "facial recognition devices," "hand geometry devices," "voice recognition devices," "iris scan devices," "retinal scan devices," "signature recognition," "keystroke recognition" and "DNA."

Each of the biometric authentication user identification types may have a rating for "Verify," meaning match/no match (and quality associated with match/read) and a rating for "ID," e.g., the ability to make an identification. These ratings may vary, e.g., from "Low" to "Medium," to "High," for "Verify" and "ID," as an example, the lighter colored squares in the chart of FIG. 2 for "Verify" or "ID" may correspond to a rating of "High," and the darker ones to a rating of "Medium." These ratings may vary, e.g., from "Low" to "Medium," to "High," to "Very High," for such categories as "Accuracy," and "Reliability." The ratings may depend on the type of biometric, and may also vary within the sub-ratings of "Low," "Medium," "High" and "Very High." Other listed factors such as "Error Rate," "Errors," possibility of "False Positives" and "False Negatives," may all be used to set the basic authentication rating/score distinguishing, e.g., fingerprints from voice recognition.

FIG. 3 may be used to evaluate the desirability, as opposed to accuracy and reliability, of various biometric systems. Some of these, such as cost, ease of use, e.g., including form factor in relation to a hosting device, as noted in the present application, may influence adjusting an overall authentication evaluation score that is acceptable, e.g., in order to account for the needs of such as cost and form factor for user devices in use when the authentication is invoked. As an example, normally the ratings/scores may be "Low"=25, "Medium"=50, "High"=75 and "Very High"=95, depending in part on, e.g., whatever overall scaling/scoring/rating algorithm is to be used. However, within, e.g., the "Very High" rating a fingerprint may only score the normal 95, but a retina or iris scan may score 97 and DNA may score 99.8. Similarly, the scores/ratings/authentication validity indicator may vary within a category such as "fingerprint."This may depend to at least some degree on the type and manufacturer of the biometric sensor, such as a fingerprint sensor, the matching algorithm used, the matching data made available by the sensor and its accuracy, etc. A traditional 2D full finger presence system, all other things being equal, may score better than a less expensive and more compact swipe type of sensor system, whether 2d or a 1D linear array. Capacitive array sensors may rate better than optical, pressure, resistive, etc.

This may also depend to some degree on the ability of the biometric sensor/evaluator to be spoofed. Similarly while DNA may be very high on the list of the authentication biometrics, how the DNA is gathered may be evaluated for possible fraud in the sample submission. DNA gathered and evaluated in a setting approximating a crime scene and crime laboratory may be extremely reliable. In the future, DNA may be able to be gathered and evaluated against a matching template in a manner similar to diabetes blood testers, in which event, the reliability of the authentication of the device itself and that the sample was taken from the present live body of the user for whom authentication is sought and without duress can be important elements in rating the value of a DNA match or other biometric match.

Currently companies such as SecureKey perform such a scoring for authentications, particularly on-line, using PINS and passwords, and the like, according to a proprietary algorithm, to arrive at an overall credential authentication foundation score for devices and/or their users. As an example, six character PINs may be given a score of 90 and four character PINs only 50. Passwords of a specified length and specified character, e.g., eight alpha-numeric characters including at least one capital letter (or, e.g., other character where the upper case "shift" key is depressed) and at least one numeral, may get a score of 90. Eight or more characters without the additional requirements may get a score of 75 and less than eight characters may get a score of 50.

Similarly within each such category, passwords randomly assigned by a governmental or other entity as opposed to selected by the user may get a higher score. Passwords required to be periodically updated without repetition may also get a bonus score and combinations of these may get a further bonus score.

In this way an overall authentication evaluation foundation score(s) may be given to an entity, e.g., a relying party, by or on behalf of which the third party risk management engine 110 of the present application is being operated, e.g., vis-à-vis a device profile score 34, which may enable the third party risk management engine 110 to make a decision on accepting the provided authentication information, or not. The score 34, as noted above, may be combined with other scores or information, e.g., scores 48, 58 and/or 32. The third party risk assessment management engine 110 may be under human control or machine control using a cognitive decision making machine following, e.g., a set of defined business rules, or both.

As an example, the third party authentication risk management engine 110 may require human intervention only in certain defined cases also provided for by the policies, business rules, or the like. According to aspects of the disclosed subject matter, it is contemplated that the credential quality assessment engine 40, 50 providing input to the user authentication profile engine 30 similarly may come up with a score 32 or other form of rating to be passed to the risk profile engine 14 and ultimately made at least a part of the information provided to the third party risk management engine 110. As noted, this may be in conjunction with or supplementary to a similar assessment of the device profile used by the device profile scoring engine 22 in arriving at the device profile engine score 34, such as is currently done by SecureKey, as an example, in assessing passwords and PINS, e.g. in the computed authentication scoring engine 42.

It will also be understood that the scores may be adjusted before reaching the third party risk assessment management engine 110 or by the third party risk assessment management engine 110 in deciding whether to accept or deny authentication, according to, e.g., the type of access being sought, and accordingly the consequences of a false positive, i.e., authentication being granted when it should not have been because the user seeking authentication or the right to access is the wrong individual attempting to defraud the authentication system and process. As an example, in decreasing order of importance of consequences of improper access, might be a list including physical access to a missile silo and ability to launch the missile, a vault at Fort Knox, a vault at the local bank, an automobile ignition normally requiring passing an incorporated breathalizer test, the operation of a rental car by an authorized driver, a lap top computer and a cellular phone. The foregoing is intended to be an example only and certainly not all inclusive, and under some circumstances may not be in the proper order, at least throughout the list. However, the list is an example of various types of access where the consequences of improper access vary from potentially catastrophic to relatively minor. These factors, i.e., the location and purpose of the identity gathering system and method used for authentication may be factored in on the front end, e.g., in the credential quality assessment engine 30 as part of creating the user authentication profile engine output 32. Such a consideration and evaluation may, therefore, be seen to be more easily and/or conveniently so done on the front end.

For example, the fact that a swiping fingerprint sensor may gather less data, or be slightly less accurate in the fingerprint image it produces, or the like, may be discounted due to the fact that controlling access to a lap top computer, in the ordinary sense, a PDA or a cellular phone, generally, requires a cheaper and more compact fingerprint sensor. Further, the consequences of a false positive grant of access ordinarily is not as vital as entry, e.g., into a laboratory where future company technology secrets are readily available. Although for certain computing devices of certain owners may require more authentication scrutiny to avoid the chance of a false positive. These considerations could result in the ultimate authentication score being given that equals that for a full finger 2D presence sensor. It will be understood that this background information could also be provided to the risk profile engine 14 and a similar adjustment for similar reasons may be made there, or the information may be ultimately provided to the third party risk management engine 110 and the adjustment made or not made there.

Those skilled in the art will understand that the adjustments to one or more of the authentication evaluation factor scores/ratings and the like may more conveniently and effectively be performed on the back end for, e.g., on-line access requests, e.g., in increasing order of possible undesirable exposure, on-line access to a Web-site, a particular Web-page, a user account, an e-wallet, etc. Thus any score/rating adjustments may be made downstream of the biometric sensor 56 or other user device and performed, e.g., in the risk profile engine 14, the risk administration console 120 and/or the third party risk management engine 110.

Other uses may be made of the systems and methods of the disclosed subject matter. As an example, the disclosed subject matter may be utilized for eliminating check-in requirements, e.g., for a prearranged rental of a car. User identity may be previously verified and authenticated as to reservation of and payment for the rental, e.g., on-line, and then the renter may, as an example, only need to go to the rental car lot and present, e.g., a credit card, a smart card and a biometric, e.g., using a biometric sensor embedded into the car door lock or the car keys for the particular car, or the like, and when authentication is approved the renter takes the car from the lot. To facilitate this, and also to fulfill legal requirements, as needed, a small printer on the car dashboard or a mobile communication device in the possession of the authenticated renter may produce a one dimensional or two dimensional bar code or other visual identifier or a challenge and response encrypted set may be provided to the renter, and egress from the rental car lot allowed due to the renter being in possession of and using the appropriate such token to authenticate the renter and the completed rental transaction agreement.

Similarly hotel and/or dinner reservations could be made and utilized with limited on no human intervention by hotel or restaurant employees until after the party with the reservation reaches the hotel room or restaurant table. Finally, as another possible use of the disclosed subject matter a previously registered and certified traveler may be allowed to bypass airport security by being authenticated as the individual so previously registered and certified according to aspects of the disclosed subject matter. The traveler presenting, as an example, a credit card and PIN, a smart card or other token and whatever authentication mechanism is embedded in the smart card and then a biometric, may be allowed to go directly to the air liner boarding gate.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure.

The disclosed subject matter also provides for the opportunity to provide user location authentication. This may be accomplished by authenticating the user or the user device and that it is in possession of the user, through various methods and systems noted above. As an example, the identity of the user device, e.g., a cellular telephone may be authenticated, as well as, e.g., through a biometric input or interaction with a token possessed by the user, or challenge/response methods, including through encrypted exchanges with private key(s) or a public/private key pair, or like possibilities, followed by an authoritative locating of the device itself, e.g., as noted above by an on-board GPs or GSM or the like base station triangulation, etc.

Figure 4:
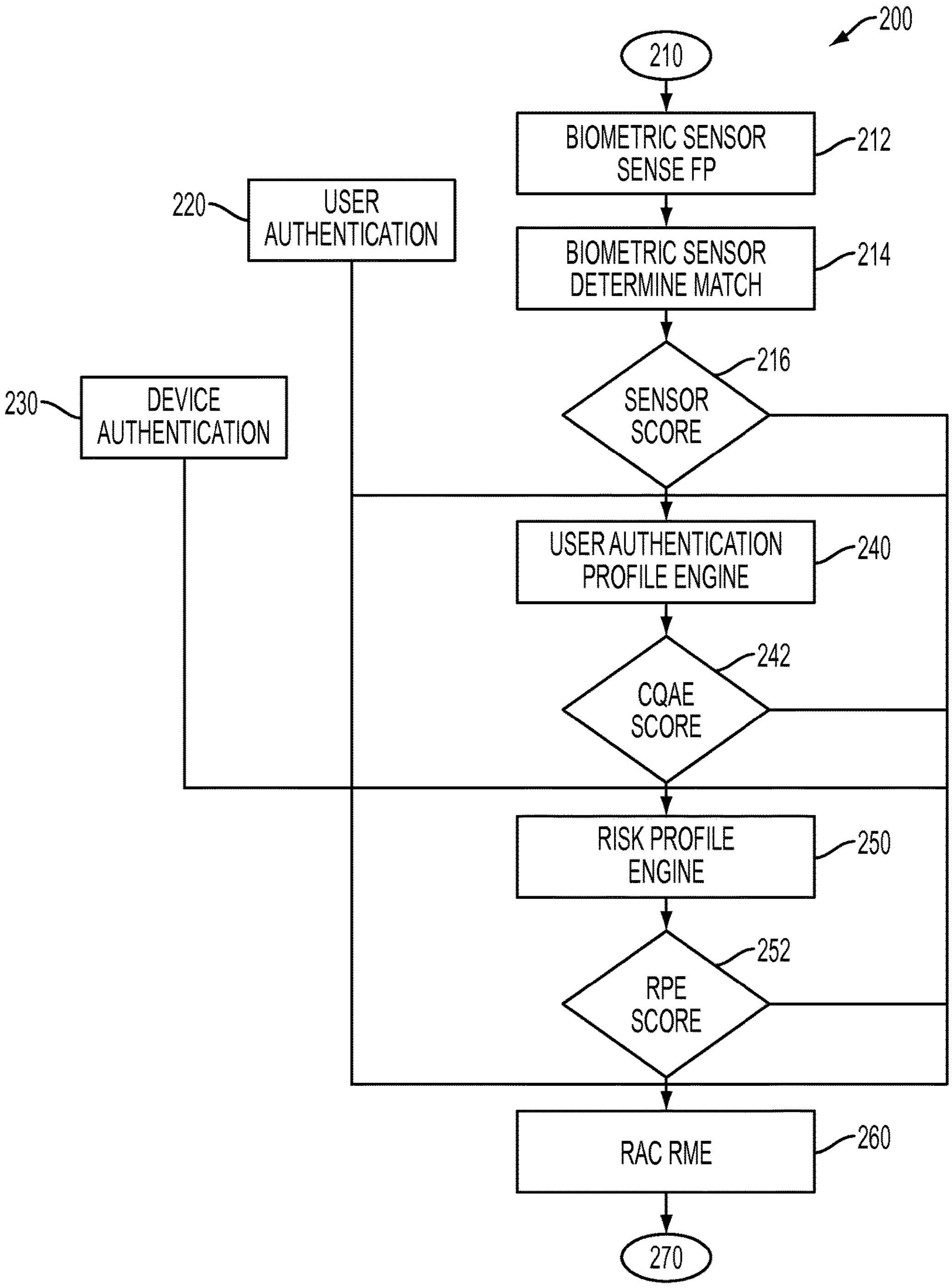
FIG. 4 shows a block diagram of the steps of a representative process according to aspects of embodiments of the disclosed subject matter.

FIG. 4 shows in block diagram form a possible process 200 for utilization of the disclosed subject matter for evaluating and deciding upon the adequacy of authentication information being used for the purpose of authenticating that a user is actually the user that the authenticator believes the user is and vice-a-versa, and scaled, as noted above, according to the circumstances, such as of the relative need for the authentication to be correct, the type of device with which the authentication information, e.g., fingerprint image, is gathered, and/or the device being protected, e.g., a mobile phone or computing device, etc. In FIG. 4, the illustrated process 200, by way of example, starts as a start 210. In block 212 a biometric sensor, e.g., a fingerprint sensor, such as 56 in FIG. 1, senses a biometric image, such as a fingerprint. In block 214 the matching engine such as 54 in FIG. 1, determines if a match is found between the sensed biometric image and a stored template.

If a match is found, then in block 216 a decision is made whether the sensor will provide an authentication evaluation score as to the match, e.g., the natural ID score of FIG. 1. This decision may be based in part on the biometric image sensed, the match and the sensor and matching module themselves. If a score is to be provided, the score is passed on to b lock 240, the credential quality assessment engine portion of the user authentication profile risk engine 32 in FIG. 1. If not, then information about, e.g., the sensor 56 and its matching module 54 and the nature of the match found, etc. may still be passed along. The credential quality assessment (risk profile) 14 engine portion of the user authentication profile risk engine 10 may also receive from block 220 information, e.g., a computed authentication score 42 from the computed authentication profile module 40 in FIG. 1

A decision is made in block 242 whether the credentials quality assessment (risk profile) engine 14 portion of the user authentication profile engine 10 is to generate a score. This may be based, at least in part, on information passed on from block 216 and/or block 220 and received by the credential quality assessment (risk profile) engine 14 portion of the user authentication profile engine 10 in FIG. 1. If it is decided that no credentials quality assessment (risk profile) engine 14 score is to be produced, then information from blocks 212, 214, 220 and 240, as well as further information from the device authentication profile engine 20, e.g., a score, is received at block 250. In block 252, at least in part based on information received by block 250, a decision is made whether the risk profile engine 14 will produce a score in block 252. If so, then the score is passed on the on-network portion 100 of the apparatus and method of the disclosed subject matter and if not information is passed along to the combination of the risk administration console ("RAC") 120 in FIG. 1 and third party risk management engine ("RME") 110 of FIG. 1, through the integration connection layer 150 in FIG. 1.

In block 260, the RAC 120 may produce a score and/or provide the received information to the RME 110 for the ultimate third party risk management assessment of the satisfactory or non-satisfactory nature of the authentication. The third party risk management engine 110, as can be seen from FIG. 4 receives all of the scores generated in the earlier parts of the system and method, plus information from which to evaluate those scores and/or generate its own final score(s) and ultimately determine if authentication is to be accepted or denied.

As can be seen from the example illustrated in FIG. 4, the third party risk management engine 110 may receive simply the natural ID score 52 from the risk profile engine 32 and risk administration console, along with information from which to evaluate that score, and perhaps also derived scores, e.g., for a computed authentication score 42, a device profile score 22 and/or a score from the credentials quality assessment engine portion 32 of the user authentication profile engine. The third party risk management engine 110 may receive any combination of the natural ID score 52 along with the computed authentication score 42 and device profile engine score 22, along with information to modify received scores and/or generate any score(s) not generated below and thus not received, or the substantial equivalent of such score(s). Either the risk assessment console 120 or the risk management engine 110 or both may make adjustments to any score(s) or combination of scores received, etc.

It will be understood by those skilled in the art that the present application discloses an authentication risk management system and method 10 which may comprise a biometric identification unit, e.g., having the sensor 56 and matching unit 54 of FIG. 1, which may be configured to sense biometric data from a user and produce an image of the sensed biometric data, such as a fingerprint, to be compared with a stored template associated with the user; and a biometric identification unit natural identification evaluation engine 50 configured to provide a natural identification authentication score, such as 52 in FIG. 1.

The system and method may further comprise a credentials quality (risk profile) assessment engine ("CQAE") 45 and 50 or 14, or a combination of these, configured to receive the natural identification authentication score and to provide a CQAE authentication score 48, 50, 30, 34 or a combination 90 of these, based on, e.g., any one or more of the natural ID score 58, and a combination of the natural ID score 58 and a received computed authentication score 48, or more. The CQAE, e.g., 14, may comprise at least a part of a user authentication profile scoring engine 30, providing an output, such as 32 in FIG. 1. The system and method 10 may further comprise the risk profile engine, such as 14, in FIG. 1, configured to provide a risk profile score 90 based on one of the natural ID score 58, and a combination of one or more of the natural ID score 58 and the computed authentication score 48 and a received device profile score 34. The risk profile engine 14 may be in communication with an on-network portion of the authentication management control system 10, such as 100 in FIG. 1. The on-network portion 100 of the authentication management control system 10 may comprise a risk management engine, such as 110 in FIG. 1.

Figure 5:
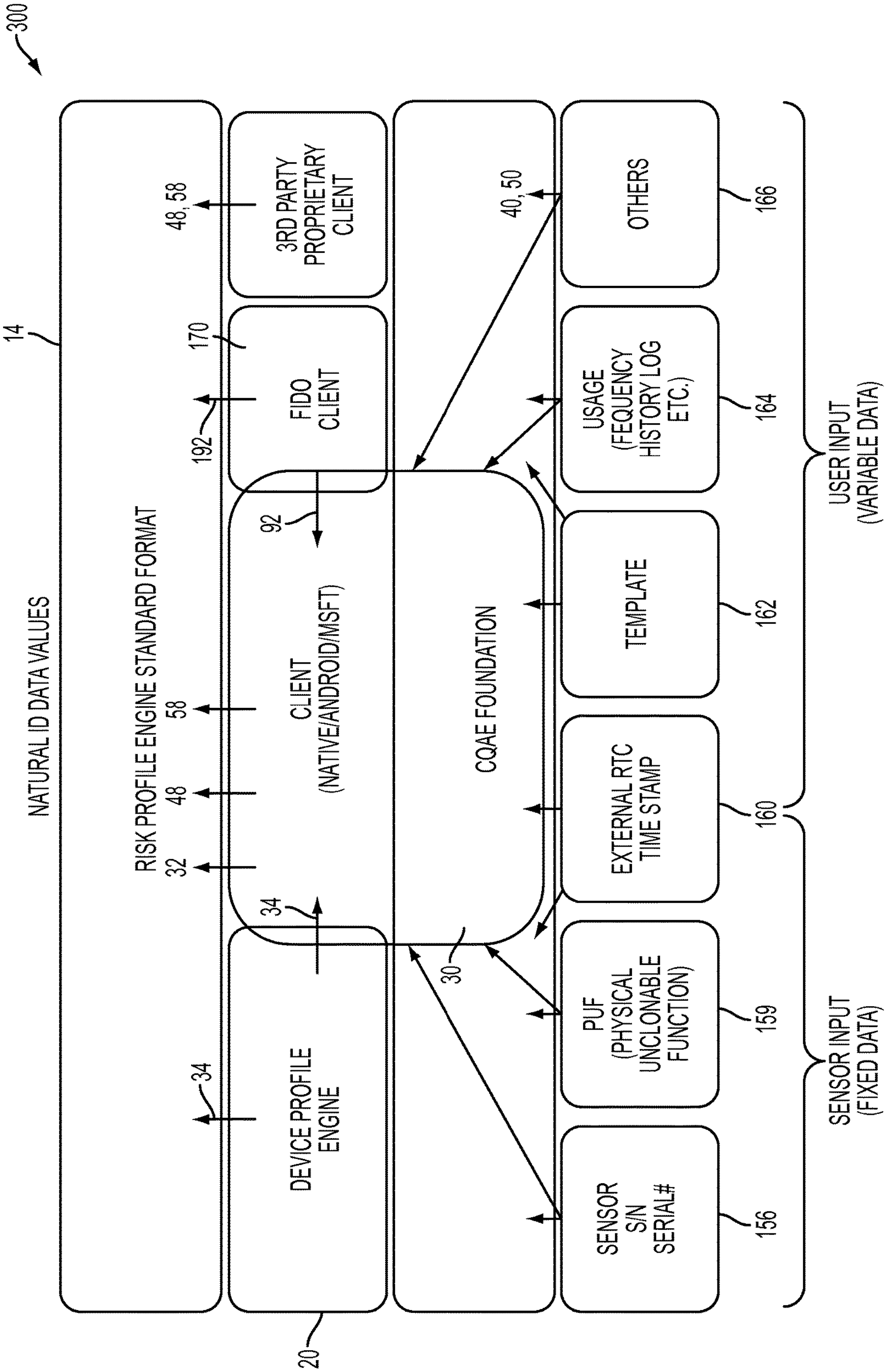
FIG. 5 shows in block diagram form an illustration of aspects of a credential quality assessment engine and the environment in which it could operate according to aspects of the disclosed subject matter.

Turning now to FIG. 5 there is illustrated in block diagram form a version of components of a credential quality assessment engine ("CQAE") 300 containing an arrangement of many elements discussed above with respect to FIG. 1. The version of the CQAE 300 may include sensor inputs, which may be fixed data, such as a sensor serial number 156, e.g., uniquely identifying the type (manufacture make and model number) of an authentication sensor 56 in FIG. 1 and information 154, e.g., identifying a characteristic(s) of the sensor 56, e.g., that it incorporates a physically uncloneable function ("PUF") to encrypt communications to the relying party, or it is an enrolled user with an enrolled user device communicating to the relying authenticator party, etc.

User input data may include, e.g., variable data, such as the user authentication biometric template 162, such as a stored fingerprint template 162. Other variable data may include, e.g., historical usage data 164, e.g., the frequency of use, a history of use log, etc. Other variable data 166 may also be included. An external real time clock ("RTC") may be used to provide time stamps 160 for both the sensor input fixed data and user input variable data. As seen in FIG. 5 such data may form inputs into either or both of a credential quality assessment engine, e.g., elements 40, 50 of FIG. 1, and a CQAE foundation portion of a client application, e.g., a Validity CQAE application provided by Validity Sensors, Inc., e.g., as part of a user authentication profile scoring engine 30 as shown in FIGS. 1 and 5 the client application 30 may be implemented in whole or in part in software, e.g., using any one of a variety of operating systems, e.g., a native operating system, an android phone operating system of a Microsoft operating system. The CQAE portion 40, 50 of the user authentication profile scoring engine 30 may provide inputs, such as 48, 58 to the risk profile engine standard format 14 directly or through the user authentication profile scoring engine 30. Similarly the device profile engine 20 may provide a score 34 to the risk profile engine standard format 14. The user authentication profile scoring engine 30 may provide scores such as 48 and 50 and/or 32 to the risk profile engine standard format 14. A third party proprietary client may be responsible for providing one or more of the scores 48 and 58 to the risk profile engine standard format 14.

A FIDO client 170 may be used to provide a score 192 to the risk profile engine standard format 14, e.g., through one or more of the elements of the interconnection layer 150. Some or all of the scores received by the risk profile engine standard format 14 may be passed on to the risk administration console 120 as part of the input 92 and/or directly to the third party risk management engine 110 as part of the input 94. Some or all of these signals may be combined or otherwise processed or manipulated in the risk profile engine 14, the interconnection layer 150, the risk administration console 120 and/or the third party risk management engine, including further combinations, manipulations or processing to achieve the desired authentication rating and decision to accept or reject the authentication being presented through the system and method 10.

Also disclosed is a tangible machine readable medium storing instructions that, when executed by a computing device, cause the computing device to perform a method, the method that may comprise producing biometric data from a user by sensing the biometric with a biometric identification unit, and producing an image of the sensed biometric from the biometric data and matching the image to a stored template associated with the user; and providing an authentication risk management natural identification authentication score using a biometric identification unit natural identification evaluation engine.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturers' library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an iPhone®, Blackberry®, Droid™ or the like, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. It should be understood that various alternatives to the embodiments of the invention described herein may be employed in practicing the invention. It is intended that the following claims define the scope of the invention and that methods and structures within the scope of these claims and their equivalents be covered thereby.

EXAMPLE

The natural authentication profile engine 50 collects information from/about the sensor and can be configurable to include, for example:

1. Recent failed swipes
2. Match Score
3. ASP Score
4. Security of match
   a. Security of enrollment template (plaintext, encrypted, encrypted and stored in secure storage)
   b. Security of swipe template (plaintext transfer to host, encrypted transfer, match on chip)
   c. Security of Match process (match on host, SecureMatch, Match on Chip)

Information can be used, for example, as follows:

```
Score = 100
If (ASP Score is low)
        Score = Score - 50;
If (Match Score is low)
        Score = Score - 20;
Score = Score - (Recent Failed Swipes * 5)
If (Security of Match is low)
Score = Score - 10
Report Score
```

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An authentication risk management system, comprising:

a biometric identification unit configured to sense biometric data from a user and produce an image of the sensed biometric data to be compared with a stored template associated with the user;

a biometric identification unit natural identification evaluation engine configured to provide a natural identification (ID) score based on a hardware marking, a quality of the image of the sensed biometric data and a matching granularity between the image of the sensed biometric data and the stored template;

a computed authentication engine configured to provide a computed authentication score based on at least one of a PIN, a password and a token; and a credentials quality assessment engine (CQAE) configured to receive the natural ID score and the computed authentication score and to provide a CQAE authentication score based on a combination of the natural ID score and the computed authentication score.

2. The authentication risk management system of claim 1 wherein the CQAE comprises at least a part of a user authentication profile engine.

3. The authentication risk management system of claim 2 further comprising:

a risk profile engine configured to provide a risk profile score based on one of the natural ID score and a combination of one or more of the computed authentication score and a received device profile score.

4. The authentication risk management system of claim 3 wherein the risk profile engine is in communication with an on-network portion of the authentication management system.

5. The authentication risk management system of claim 4 wherein the on-network portion of the authentication management control system includes a risk management engine.

6. The authentication risk management system of claim 1 further comprising:

a risk profile engine configured to provide a risk profile score based on one of the natural ID score and a combination of one or more of the computed authentication score and a received device profile score.

7. The authentication risk management system of claim 6 wherein the risk profile engine is in communication with an on-network portion of the authentication management system.

8. The authentication risk management system of claim 7 wherein the risk profile engine is in communication with an on-network portion of the authentication management system.

9. The authentication risk management system of claim 8 wherein the on-network portion of the authentication management control system includes a risk management engine.

10. A method of authentication risk management, comprising:

producing biometric data from a user by sensing a biometric input with a biometric identification unit, and producing an image of the biometric input from the biometric data, and matching the image to a stored template associated with the user;

providing an authentication risk management natural identification authentication score using a biometric identification unit natural identification evaluation engine, wherein the natural identification authentication score is based on a hardware marking, a quality of the image of the biometric input and a matching granularity between the image of the biometric input and the stored template;

generating a computed authentication score based on at least one of a PIN, a password and a token; and receiving the natural identification authentication score and the computed authentication score and providing a credentials quality assessment engine (CQAE) authentication score based on a combination of the natural identification authentication score and the computed authentication score.

11. The method of claim 10 wherein the received computed authentication score is based on at least one of a PIN, a password and a token.

12. The method of claim 10 wherein the CQAE comprises at least a part of a user authentication profile engine.

13. The method of claim 12 further comprising providing a risk profile score, using a risk profile engine, based on one of the natural identification authentication score and a combination of one or more of the computed authentication score and a received device profile score.

14. The method of claim 13 further comprising:

communicating through the risk profile engine with an on-network third party risk assessment engine.

15. The method of claim 10 further comprising providing a risk profile score, using a risk profile engine, based on one of the natural identification authentication score and a combination of one or more of the computed authentication score and a received device profile score.

16. The method of claim 15 further comprising:

communicating through the risk profile engine with an on-network third party risk assessment engine.

17. A tangible machine readable medium storing instructions that, when executed by a computing device, cause the computing device to perform a method, the method comprising:

producing biometric data from a user by sensing a biometric with a biometric identification unit, and producing an image of the biometric from the biometric data, and matching the image to a stored template associated with the user;

providing an authentication risk management natural identification authentication score using a biometric identification unit natural identification evaluation engine, wherein the natural identification authentication score is based on a hardware marking, a quality of the image of the biometric and a matching granularity between the image of the biometric and the stored template;

generating a computed authentication score based on at least one of a PIN, a password and a token; and receiving the natural identification authentication score and the computed authentication score and providing a credentials quality assessment engine (CQAE) authentication score based on a combination of the natural identification authentication score and the computed authentication score.

18. The machine readable medium of claim 17 wherein the received computed authentication score is based on at least one of a PIN, a password and a token.

19. The machine readable medium of claim 17 wherein the CQAE comprises at least a part of a user authentication profile engine.

* * * * *